(12) United States Patent
Thangarasa et al.

(10) Patent No.: US 11,234,109 B2
(45) Date of Patent: Jan. 25, 2022

(54) MEASUREMENT REPORTING UNDER EXTENDED COVERAGE

(71) Applicant: TELEFONAKTIEBOLAGET LM ERICSSON (PUBL), Stockholm (SE)

(72) Inventors: Santhan Thangarasa, Vallingby (SE); Muhammad Kazmi, Sundbyberg (SE); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 27 days.

(21) Appl. No.: 16/479,055

(22) PCT Filed: Feb. 2, 2018

(86) PCT No.: PCT/IB2018/050678
§ 371 (c)(1),
(2) Date: Jul. 18, 2019

(87) PCT Pub. No.: WO2018/142347
PCT Pub. Date: Aug. 9, 2018

(65) Prior Publication Data
US 2019/0380017 A1      Dec. 12, 2019

Related U.S. Application Data

(60) Provisional application No. 62/454,556, filed on Feb. 3, 2017.

(51) Int. Cl.
*H04W 4/70*     (2018.01)
*H04W 24/10*    (2009.01)
*H04W 84/18*    (2009.01)

(52) U.S. Cl.
CPC ............. *H04W 4/70* (2018.02); *H04W 24/10* (2013.01); *H04W 84/18* (2013.01)

(58) Field of Classification Search
None
See application file for complete search history.

(56) References Cited

U.S. PATENT DOCUMENTS

2013/0235738 A1    9/2013   Siomina et al.
2016/0218788 A1*   7/2016   Yum .................... H04B 7/0626
(Continued)

FOREIGN PATENT DOCUMENTS

CN      104811995 A    7/2015
RU      2592775 C2     9/2015
(Continued)

*Primary Examiner* — Hong Shao

(57) ABSTRACT

In one aspect there is provided a method for reporting measurements from a wireless device to a network node in a wireless communication network. In some embodiments, the method includes: obtaining at least one measurement configuration for performing at least one measurement; obtaining an uplink (UL) transmission configuration; performing at least one measurement to obtain at least one measurement result; and reporting the at least one measurement result to the network node by applying the obtained UL transmission configuration. The UL transmission configuration comprises at least one parameter associated with a repetition level of an uplink signal to be used by the wireless device for reporting at least one measurement result to the network node, the repetition level of the uplink signal being at least partially dependent on a type of measurement and/or event for which the at least one measurement is performed.

26 Claims, 7 Drawing Sheets

(56) References Cited

U.S. PATENT DOCUMENTS

2016/0295624 A1   10/2016  Novlan et al.
2017/0374574 A1*  12/2017  Lee ..................... H04W 24/08
2018/0091280 A1    3/2018  Kim et al.

FOREIGN PATENT DOCUMENTS

| WO | WO-2015047180 A1 * | 4/2015 | ........ H04W 36/0094 |
| WO | 2016108504 A1 | 7/2016 | |
| WO | 2016175576 A1 | 11/2016 | |

* cited by examiner

MEASUREMENT REPORTING UNDER EXTENDED COVERAGE

RELATED APPLICATIONS

This application is a 371 of International Application No. PCT/IB2018/050678, filed Feb. 2, 2018, which claims the priority and benefit of U.S. Patent Application 62/454,556, filed Feb. 3, 2017, entitled "Method for measurement reporting under extended coverage", the disclosures of which are fully incorporated herein by reference.

TECHNICAL FIELD

Disclosed are embodiments for improving measurement reporting under extended coverage or coverage enhancement (CE) in a wireless communication system.

BACKGROUND

I. Machine Type Communication (MTC) Devices

A mobile wireless communication system must support a diverse set of use cases and a diverse set of deployment scenarios. One use case or deployment scenario that is expected to become more common in an increasingly interconnected world is machine-to-machine (M2M) communication (or aka machine type communication (MTC)), which refers to establishment of communication between machines and/or between machines and humans. M2M communication may comprise of exchange of data, signaling, measurement data, configuration information etc. The size of M2M devices may vary from that of a wallet to that of a base station. The M2M devices are quite often used for applications like sensing environmental conditions (e.g. temperature reading), metering or measurement (e.g. electricity usage etc.), fault finding or error detection etc. In these applications the M2M devices are active very seldom but over a consecutive duration depending upon the type of service e.g. about 200 ms once every 2 seconds, about 500 ms every 60 minutes etc. The M2M device may also do measurement on other frequencies or other RATs.

An M2M or MTC device is typically expected to be of low cost and low complexity. A low complexity wireless device envisaged for M2M operation may implement one or more low cost features like, smaller downlink and uplink maximum transport block size (e.g. 1000 bits) and/or reduced downlink channel bandwidth of 1.4 MHz for data channel (e.g. PDSCH). A low cost device may also include a half-duplex (HD-FDD) communication link capability and/or one or more of the following additional features: a single receiver (1 Rx), a smaller downlink and/or an uplink maximum transport block size (e.g. 1000 bits) and reduced downlink channel bandwidth of 1.4 MHz for a data channel. A low cost device or UE may also be termed as a low complexity device or UE.

The path loss between an M2M device and the base station can be very large in some scenarios such as when the M2M device is used as a sensor or metering device located in a remote location such as in the basement of the building. In such scenarios the reception of a signal from a base station or other transmission point is very challenging. For example, the path loss can be worse than 20 dB compared to normal operation. In order to cope with such challenges the coverage in uplink and/or in downlink has to be substantially enhanced with respect to the normal coverage (i.e., legacy coverage). This is realized by employing one or a plurality of advanced techniques in the UE and/or in the radio network node for enhancing the coverage. Some non-limiting examples of such advanced techniques include (but are not limited to) transmit power boosting, repetition of transmitted signal, applying additional redundancy to the transmitted signal, use of advanced/enhanced receiver etc. In general, when employing such coverage enhancing techniques the M2M device is regarded to be operating in a "coverage enhancement mode". Moreover, a low complexity UE (e.g. UE with 1 Rx) may be capable of supporting a coverage enhancement mode of operation.

II. Narrow Band Internet of Things (NB-IoT)

The Narrow Band Internet of Things (NB-IOT) is a radio access scheme for cellular internet of things (IOT), based to a great extent on a non-backward-compatible variant of E-UTRA, that addresses improved indoor coverage, support for massive number of low throughput devices, low delay sensitivity, ultra-low device cost, low device power consumption and (optimized) network architecture.

The NB-IOT carrier bandwidth (Bw2) is 200 KHz. Examples of operating bandwidth (Bw1) of LTE are 1.4 MHz, 3 MHz. 5 MHz, 10 MHz, 15 MHz, 20 MHz etc.

NB-IoT supports 3 different deployment scenarios:

A first deployment scenario is "stand-alone operation" utilizing for example the spectrum currently being used by GERAN systems as a replacement of one or more GSM carriers. In principle it operates on any carrier frequency which is neither within the carrier of another system not within the guard band of another system's operating carrier. The other system can be another NB-IOT operation or any other RAT, such as LTE.

A second deployment scenario is "guard band operation" utilizing the unused resource blocks within a LTE carrier's guard-band. The term guard band may also interchangeably be called as guard bandwidth. As an example in case of LTE bandwidth of 20 MHz (i.e. Bw1=20 MHz or 100 RBs), the guard band operation of NB-IOT can be placed anywhere outside the central 18 MHz but within 20 MHz LTE BW.

A third deployment scenario is "in-band operation" utilizing resource blocks within a normal LTE carrier. The in-band operation may also interchangeably be called in-bandwidth operation. More generally the operation of one RAT within the bandwidth of another RAT is also called as in-band operation. As an example, in a LTE bandwidth of 50 RBs (i.e. Bw1=10 MHz or 50 RBs), NB-IOT operation over one resource block (RB) within the 50 RBs is called in-band operation.

In NB-IOT the downlink transmission is based on OFDM with 15 kHz subcarrier spacing and same symbol and cyclic prefix durations as for legacy LTE for all the scenarios: standalone, guard-band, and in-band. For UL transmission, both multi-tone transmissions based with a 15 kHz subcarrier spacing on SC-FDMA, and single tone transmission, with either 3.75 kHz or 15 kHz subcarrier spacing, is supported.

Downlink transmission is based on OFDM with 15 kHz sub-carrier spacing. Uplink transmission is based on SC-FDMA, supporting single tone or multi-tone (3, 6 or 12 tones) transmissions.

III. Cell Search

In an FDD configuration of LTE, downlink (DL) subframe #0 and subframe #5 carry synchronization signals (i.e. both PSS and SSS). In TDD configurations the two pairs of synchronization signals per radio frame are carried by subframes 0 and 1, and 5 and 6, respectively. For brevity and to simplify discussion, cell search is described herein with reference to only an FDD configuration. There are however no significant differences regarding cell search in FDD and TDD systems, hence the description can easily be adapted to TDD scenarios.

In order to identify an unknown cell (e.g., a new neighbor cell) a wireless device acquires the timing of that cell and eventually the physical cell ID (PCI). Subsequently the wireless device also measures RSRP and/or RSRQ of the newly identified cell in order to use by itself (in case of wireless device-controlled mobility in idle mode) and/or report the measurement to the network node. In total there are 504 PCIs.

Therefore, the UE searches or identifies a cell (i.e. acquires the PCI of the cell) by correlating the received PSS/SSS signals in DL subframe #0 and/or in DL subframe #5 with one or more of the pre-defined PSS/SSS sequences. The use of subframe #0 and/or in DL subframe #5 for PCI acquisition depends upon the wireless device implementation. The wireless device regularly attempts to identify neighbor cells on at least the serving carrier frequenc(ies). But it may also search cells on non-serving carrier(s) when configured by the network node to do so. In order to minimize wireless device power consumption, typically the wireless device searches in one of the DL subframes that carries synchronization signals, i.e., #0 or #5. In order to further save its battery power the wireless device searches for newly detectable neighbor cells on the intra-frequency carrier once every 40 ms in non-DRX or in a short DRX cycle (e.g. up to 40 ms). In longer DRX cycles the wireless device typically searches for newly detectable neighbor cells once every DRX cycle. During each search attempt the wireless device typically stores a snapshot of radio samples of 5-6 ms and post processes those samples by correlating the stored signals with the known PSS/SSS sequences. The reason for acquiring 5-6 ms of radio samples is that in case the neighbor cell(s) are not synchronous to the serving cell, the wireless device does not know where exactly to find the synchronization signal, but knows that there will be one such signal transmitted every 5 ms. In non-DRX the wireless device is able to identify an intra-frequency cell (including RSRS/RSRQ measurements) within 800 ms (i.e. 20 attempts in total including 15 and 5 samples, respectively, for cell identification (PCI acquisition) and RSRP/RSRQ measurement).

The current search requirements for eMTC/feMTC depend on the coverage mode which includes CEModeA and CEModeB or normal coverage and enhanced coverage. The coverage modes and the different coverage areas for eMTC/feMTC/Nb-IOT are described in the detailed description section below. In CONNECTED state, the eMTC/feMTC UE may need gaps in order to perform the cell search procedure since the wireless device channel bandwidth can be limited and it can be anywhere within the system bandwidth. But the PSS/SSS are always transmitted on the central 6 PRBs. The gaps are used by the wireless device to retune to the central PRBs to read and acquire the PCI of the cell. Hence, the cell identification delays are much longer than what is typically required for LTE wireless devices. In addition, the delays depend also on the gap pattern ID.

The intra-frequency category M1 CEModeA cell identification delay and measurement delay are specified in Table 8.13.2.1.1.1-1 from 3GPP TS 36.133 v13.6.0, which specifies the following requirements on cell identification delay and measurement delay for an FDD intrafrequency cell:

| Gap pattern ID | Cell identification delay ($T_{identify\_intra\_UE\ cat\ M1}$) | Measurement delay ($T_{measure\_intra\_UE\ cat\ M1}$) |
|---|---|---|
| 0 | 1.44 seconds | 480 ms |
| 1 | 2.88 seconds | 960 ms |

The corresponding intra-frequency category M1 CEModeB requirements depends on the Ês/iot of an already identified cell and a neighbouring cell which is being detected as follows:

| SCH Ês/Iot of already identified cell including serving cell: Q1 | Neighouring cell SCH Ês/lot: Q2 | Cell identification delay ($T_{identify\_intra\_UE\ cat\ M1}$) | Measurement delay ($T_{measure\_intra\_UE\ cat\ M1}$) |
|---|---|---|---|
| −15 ≤ Q1 < −6 | −15 ≤ Q2 < −6 | As defined in table 8.13.3.1.1.1-1 | As defined in table 8.13.3.1.1.1-1 |
| −15 ≤ Q1 < −6 | Q2 ≥ −6 | Requirements in clause 8.13.2 of TS 36.133 apply | Requirements in clause 8.13.2 of TS 36.133 apply |
| Q1 ≥ −6 | Q2 ≥ −6 | Requirements in clause 8.13.2 of TS 36.133 apply | Requirements in clause 8.13.2 of 36.133 apply |

Table 8.13.3.1.1.1-1 from 3GPP TS 36.133 v13.6.0, referenced by the table above, specifies the following requirements on cell identification delay and measurement delay for FDD intrafrequency cell:

| Gap pattern ID | Cell identification delay ($T_{identify\_intra\_UE\ cat\ M1}$) | Measurement delay ($T_{measure\_intra\_UE\ cat\ M1}$) |
|---|---|---|
| 0 | 320.8 s | 800 ms |
| 1 | 321.6 s | 1600 ms |

For NB-IOT, also known as UE category NB1, the release 13 cell identification requirements are defined in IDLE state. Similar to category M1, these requirements also depend on the coverage mode. The requirements are more relaxed for the enhanced coverage compared to normal coverage and it also depends on the Es/Iot of the already detect cell. However, since the NB-IOT cell search is performed in IDLE state gaps are not needed. For shortest DRX cycle length, the detection delay is specified as 51 seconds in normal coverage and the measurement period as 1.28 seconds. However, corresponding requirements in enhanced coverage is up to 532 seconds while the measurement period remains the same as in normal coverage. The exact requirements can be found in Table 4.6.2.2-1 in TS 36.133 v13.6.0 for normal coverage and Table 4.6.2.4-3 in 36.133 v13.6.0 for enhanced coverage.

IV. Wireless Device Measurements

Radio measurements done by a wireless device are typically performed on a serving cell as well as on neighbour cells over some known reference symbols or pilot sequences. The measurements are done on cells on an intra-frequency carrier, inter-frequency carrier(s) as well as on inter-RAT carriers(s) (depending upon the UE capability whether it supports that RAT). To enable inter-frequency and inter-RAT measurements for the wireless device requiring gaps, the network configures the measurement gaps.

The measurements are done for various purposes. Some example measurement purposes are: mobility, positioning, self-organizing network (SON), minimization of drive tests (MDT), operation and maintenance (O&M), network planning and optimization etc. Examples of measurements in an LTE network are Cell identification (also called PCI acquisition), Reference Symbol Received Power (RSRP), Reference Symbol Received Quality (RSRQ), SNR, BLER, NRSRP, NRSRQ, S-RSRP, RS-SINR, CSI-RSRP, acquisition of system information (SI), cell global ID (CGI) acquisition. Reference Signal Time Difference (RSTD), UE RX-TX time difference measurement, RTT, TOA, TDOA, AOA, Radio Link Monitoring (RLM), which consists of Out of Synchronization (out of sync) detection and In Synchronization (in-sync) detection etc. CSI measurements performed by the wireless device are used for scheduling, link adaptation etc. by network. Examples of CSI measurements or CSI reports are CQI, PMI, RI etc. They may be performed on reference signals like CRS, CSI-RS or DMRS.

The measurements may be unidirectional (e.g., DL or UL) or bidirectional (e.g., having UL and DL components such as Rx-Tx, RTT, etc).

The DL subframe #0 and subframe #5 carry synchronization signals (i.e. both PSS and SSS). In order to identify an unknown cell (e.g. new neighbor cell) the wireless device acquires the timing of that cell and eventually the physical cell ID (PCI). This is called cell search or cell identification or even cell detection. Subsequently the wireless device also measures RSRP and/or RSRQ of the newly identified cell in order to use itself and/or report the measurement to the network node. In total there are 504 PCIs. The cell search is also a type of measurement.

The measurements are done in all RRC states, i.e. in RRC idle and RRC connected states.

Any of the above measurements performed by the wireless device can be reported by the wireless device to another node e.g., network node, another wireless device etc.

SUMMARY

According to current solutions for reporting measurements in wireless communication systems, measurement results transmitted to a serving cell may not be successfully received at the network node (e.g., serving network node) if current requirements are applied and especially if the wireless device is operating under enhanced coverage. This is because the uplink received quality of a channel containing the measurement results could be below the required level and could lead to decoding failure at the receiver of the serving network node. Furthermore, uplink and downlink power levels and/or radio conditions may differ. In other words, the current reporting mechanism especially under enhanced coverage is not reliable and will lead to failure of any procedure which relies on wireless device reported measurement results. Examples of such procedures are scheduling power control, mobility, SON, MDT, positioning, network planning etc.

Embodiments disclosed herein improve the success of uplink transmissions of measurement results by adapting a number of repetitions of a signal carrying the measurement results in dependence on a on a type of measurement and/or event from which the measurement results are obtained. The number of repetitions may also depend on various other factors including, e.g., a coverage enhancement (CE) level of the wireless device with respect to the network node, a pre-defined rule; and/or one or more historical repetition values used in the past. Advantageously, measurement results (such as RSRP/RSRQ/NRSRP/NRSRQ) may be correctly received in the network node and in a timely manner, thereby improving effectiveness and efficiency of procedures that rely on such measurement results.

Accordingly, in one aspect, there is provided a method for reporting measurements from a wireless device to a network node in a wireless communication network. The method includes obtaining at least one measurement configuration for performing at least one measurement and obtaining an uplink transmission configuration. The uplink transmission configuration includes at least one parameter associated with a repetition level of an uplink signal to be used by the wireless device for reporting at least one measurement result to the network node. Moreover, the repetition level of the uplink signal is at least partially dependent on a type of measurement and/or event for which the at least one measurement is performed. The method further includes performing at least one measurement to obtain at least one measurement result, and reporting the at least one measurement result to the network node by applying the obtained UL transmission configuration.

In some embodiments the repetition level of the uplink signal is further at least partially dependent on one or more of: a repetition level of a downlink signal, information received from another network node, a coverage enhancement (CE) level of the wireless device with respect to the network node, a pre-defined rule: and/or one or more historical repetition values used in the past.

In some embodiments, the method also includes receiving instructions from the network node for implementing a procedure that relies on the at least one measurement result.

In another aspect there is provided a wireless device for configuring carrying out the method of any of the foregoing embodiments. The wireless device may be embodied as functional unit or modules, each corresponding to a function of the method. The wireless device may also include various components such as a transceiver, processing circuitry, and memory that implement the method.

In another aspect there is provided a method for configuring a wireless device for reporting measurements from the wireless device to a network node in a wireless communication network. The method includes obtaining information about whether the wireless device is configured or is to be configured to perform at least one measurement. The method further includes determining an uplink (UL) transmission configuration for the wireless device based on the obtained information about whether the wireless device is configured or is to be configured to perform at least one measurement. The UL transmission configuration includes at least one parameter associated with a repetition level of an uplink signal to be used by the wireless device for reporting at least one measurement result to the network node. Moreover, the repetition level of the uplink signal is at least partially dependent on a type of measurement and/or event for which the at least one measurement is performed. The method further includes configuring the wireless device with the determined UL transmission configuration.

In some embodiments the type of measurement and/or event is either periodically reported or event-triggered and when the uplink signal is used for reporting an event-triggered measurement the repetition level is higher than when the uplink signal is used for reporting a periodic measurement.

In some embodiments, the method also includes receiving the at least one measurement result and using the at least one measurement result to implement a procedure.

The procedure may include a portion implemented by the wireless device and thus the method may also include sending instructions to the wireless device to implement the wireless device portion of the procedure.

In another aspect there is provided a network node for configuring carrying out the method of any of the foregoing network node method embodiments. The network node may be embodied as functional unit or modules, each corresponding to a function of the method. The network node may also include various components such as a transceiver, processing circuitry, and memory that implement the method.

Embodiments herein also include corresponding computer programs, carriers, and computer program products.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
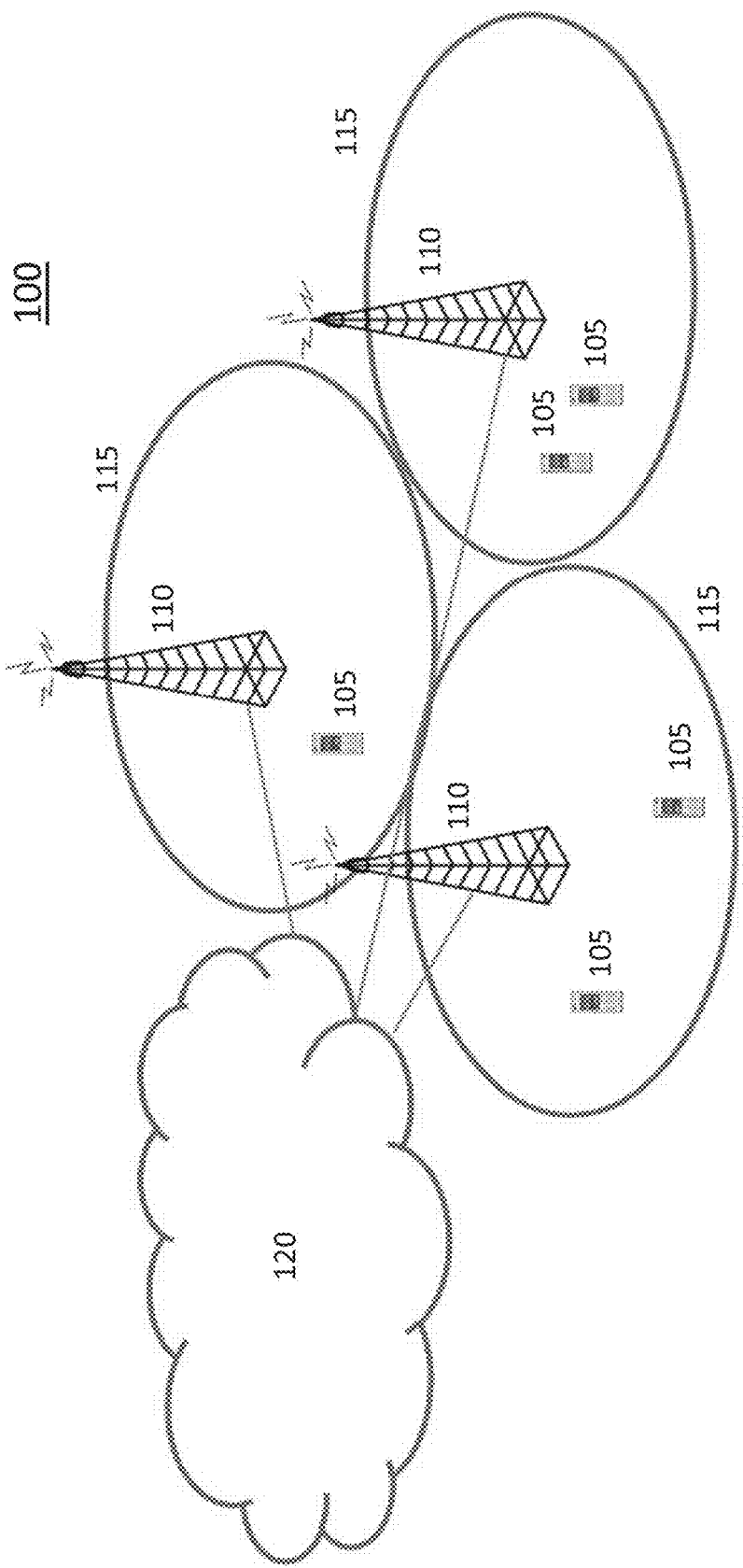
FIG. 1 illustrates communication system according to an embodiment of the disclosed subject matter.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

I. General Description of Operating Scenarios

In some embodiments the non-limiting terms UE or a wireless device are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE) etc.

Also in some embodiments the generic term "radio network node" is used. It can be any kind of a radio network node which may comprise any of base station, radio base station, base transceiver station, base station controller, network controller, RNC, evolved Node B (eNB), Node B, Multi-cellimulticast Coordination Entity (MCE), relay node, access point, radio access point, Remote Radio Unit (RRU) Remote Radio Head (RRH).

In some embodiments the UE may be configured with PCell and PSCell or with PCell, PSCell and one or more SCells such as in dual connectivity and/or carrier aggregation. The configured cells are UE specific aka serving cells of the UE.

The UE is served by a serving cell which has already been identified by the UE. The UE further identifies at least one another cell, which may be called a target cell or neighbor cell. In some embodiments the serving cell and neighbor cell are served or managed by the first network node and the second network node, respectively. In some embodiments the serving cell and neighbor cell are served or managed by the same network node e.g. a first network node.

The embodiments are applicable for a UE in a low or in high activity state. Examples of low activity state are RRC idle state, idle mode etc. Examples of low activity state are RRC CONNECTED state, active mode, active state etc. The UE may be configured to operate in DRX or in non-DRX. If configured to operate in DRX, it may still operate according to non-DRX as long as it receives new transmissions from the network node.

The UE may operate under either normal coverage or enhanced coverage with respect to its serving cell. The enhanced coverage is also interchangeably called extended coverage. The UE may also operate in a plurality of coverage levels (CE) e.g. normal coverage (aka CE level 0), enhanced coverage level 1 (CE1), enhanced coverage level 2 (CE2), enhanced coverage level 3 (CE3) and so on. The UE, supporting the operation under at least two coverage levels, may e.g. operate at a time under either normal coverage or enhanced coverage with respect to the cell e.g. serving cell.

The normal and extended coverage operations may typically take place on narrower UE RF bandwidth compared with the system bandwidth aka cell BW, cell transmission BW, DL system BW etc. In some embodiments the UE RF BW can be the same as of the system bandwidth. Examples of narrow RF BWs are 200 KHz, 1.4 MHz etc. Examples of system BW are 200 KHz, 1.4 MHz, 3 MHz. 5 MHz, 10, MHz, 15 MHz, 20 MHz etc. In case of extended/enhanced coverage, the UE may be capable of operating under lower signal quality level (e.g. SNR, SINR, ratio of average received signal energy per subcarrier to total received power per subcarrier ($\hat{E}s/Iot$)), RSRQ etc) compared to its capabilities when operating in legacy systems. The coverage level enhancement may vary with the operational scenario and may also depend on the UE type. For example, a UE which is located in a basement with bad coverage may need larger level of coverage enhancement (e.g. 20 dB) compared to a UE which is at a cell border (e.g. −3 dB).

The coverage level of the UE may be defined with respect to any cell e.g. serving cell, non-serving cell, neighbor cell etc. The coverage level is also interchangeably called as the coverage enhancement (CE) level. For example, the CE level with respect to a cell can be expressed in terms of signal level received at the UE from that cell. Alternatively, the CE level of the UE with respect to a cell can be expressed in terms of signal level received at the cell from the UE. As an example, received signal level can be expressed in terms of received signal quality and/or received signal strength at the UE with respect to the cell. More specifically the coverage level may be expressed in terms of:

received signal quality and/or received signal strength at the UE with respect to a cell and/or received signal quality and/or received signal strength at the cell with respect to the UE.

Examples of signal quality are SNR. SINR, CQI, RSRQ, NRSRQ, CRS Ês/Iot, SCH Ês/Iot etc. Examples of signal strength are path loss, path gain, RSRP. NRSRP, SCH_RP etc.

The notation Ês/Iot is defined as ratio of

Ês, which is the received energy per RE (power normalized to the subcarrier spacing) during the useful part of the symbol, i.e. excluding the cyclic prefix, at the UE antenna connector, to Iot which is the received power spectral density of the total noise and interference for a certain RE (power integrated over the RE and normalized to the subcarrier spacing) as measured at the UE antenna connector The CE level is also expressed in terms of two or more discrete levels or values e.g. CE level 1, CE level 2. CE level 3 etc. Consider an example of 2 coverage levels defined with respect to signal quality (e.g. SNR) at the UE comprising:

Coverage enhancement level 1 (CE1) comprising of $SNR \geq -6$ dB at UE with respect to a cell: and Coverage enhancement level 2 (CE2) comprising of $-15$ dB $\leq SNR < -6$ dB at UE with respect to a cell.

In the above example the CE1 may also be interchangeably called as normal coverage level, baseline coverage level, reference coverage level, legacy coverage level etc. On the other hand CE2 may be termed as enhanced coverage or extended coverage level.

In another example two different coverage levels (e.g. normal coverage and enhanced coverage) may be defined in terms of signal quality levels as follows:

The requirements for normal coverage are applicable for the UE category NB1 with respect to to a cell provided that radio conditions of the UE with respect to that cell are defined as follows SCH Ês/Iot$\geq -6$ dB and CRS Ês/Iot$\geq -6$.

The requirements for enhanced coverage are applicable for the UE category NB1 with respect to to a cell provided that radio conditions of the UE with respect to that cell are defined as follows SCH Ês/Iot$\geq -15$ dB and CRS Ês/Iot$\geq -15$.

A parameter defining coverage level of the UE with respect to a cell may also be signalled to the UE by the network node. Examples of such parameters are CEModeA and CEModeB signalled to UE category M1 where, for example:

the requirements for CEMode A apply provided the UE category M1 is configured with CEMode A, SCH Ês/Iot$\geq -6$ dB and CRS Ês/Iot$\geq -6$ dB, and the requirements for CEMode B shall apply provided the UE category M1 is configured with CEMode B. SCH Ês/Iot$\geq -15$ dB and CRS Ês/Iot$\geq -15$ dB.

In the above examples Ês/Iot is the ratio of received power per subcarrier to the total interference including noise per subcarrier.

The described embodiments may be implemented in any appropriate type of communication system supporting any suitable communication standards and using any suitable components. As one example, certain embodiments may be implemented in an LTE network or NR network, such as that illustrated in FIG. 1.

Referring to FIG. 1, a communication network 100 comprises a plurality of wireless devices 105 and a plurality of radio access nodes 110. Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 2:
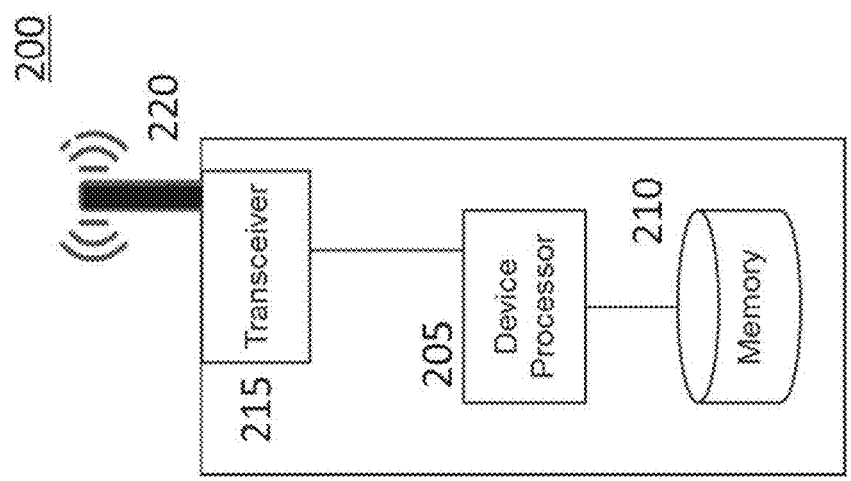
FIG. 2 illustrates a wireless communication device according to an embodiment of the disclosed subject matter.

Although wireless devices 105 may represent communication devices that include any suitable combination of hardware and/or software, these wireless devices may, in certain embodiments, represent devices such as an example wireless device 105 illustrated in greater detail by FIG. 2. Similarly, although the illustrated radio access node may represent network nodes that include any suitable combination of hardware and/or software, these nodes may, in particular embodiments, represent devices such as the example radio access node 110 illustrated in greater detail by FIG. 3.

Referring to FIG. 2, a wireless device 200 comprises processing circuitry 205, a memory 210, transceiver circuitry 215, and an antenna 220. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 2. Alternative embodiments may include additional components beyond those shown in FIG. 2 that may be responsible for providing certain aspects of the device's functionality, including any of the functionality described herein.

Figure 3:
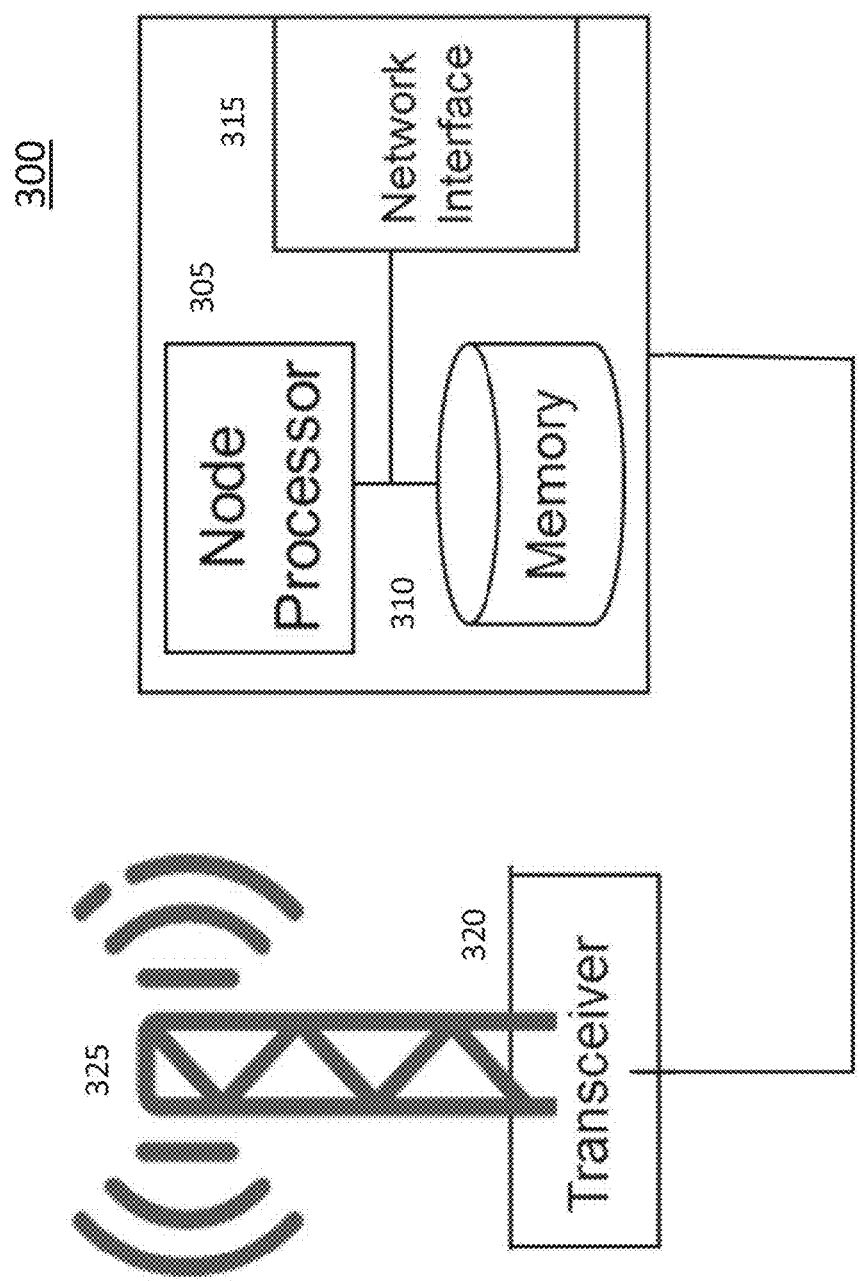
FIG. 3 illustrates a network node according to an embodiment of the disclosed subject matter.

Referring to FIG. 3, a radio access node 300 comprises a node processing circuitry 305, a memory 310, a network interface 315, transceiver circuitry 320, and an antenna 325. In certain embodiments, some or all of the functionality described as being provided by a base station, a node B, an enodeB, a gnodeB, and/or any other type of network node may be provided by node processor 305 executing instructions stored on a computer-readable medium, such as memory 310 shown in FIG. 3. Alternative embodiments of radio access node 300 may comprise additional components to provide additional functionality, such as the functionality described herein and/or related supporting functionality.

Figure 4:
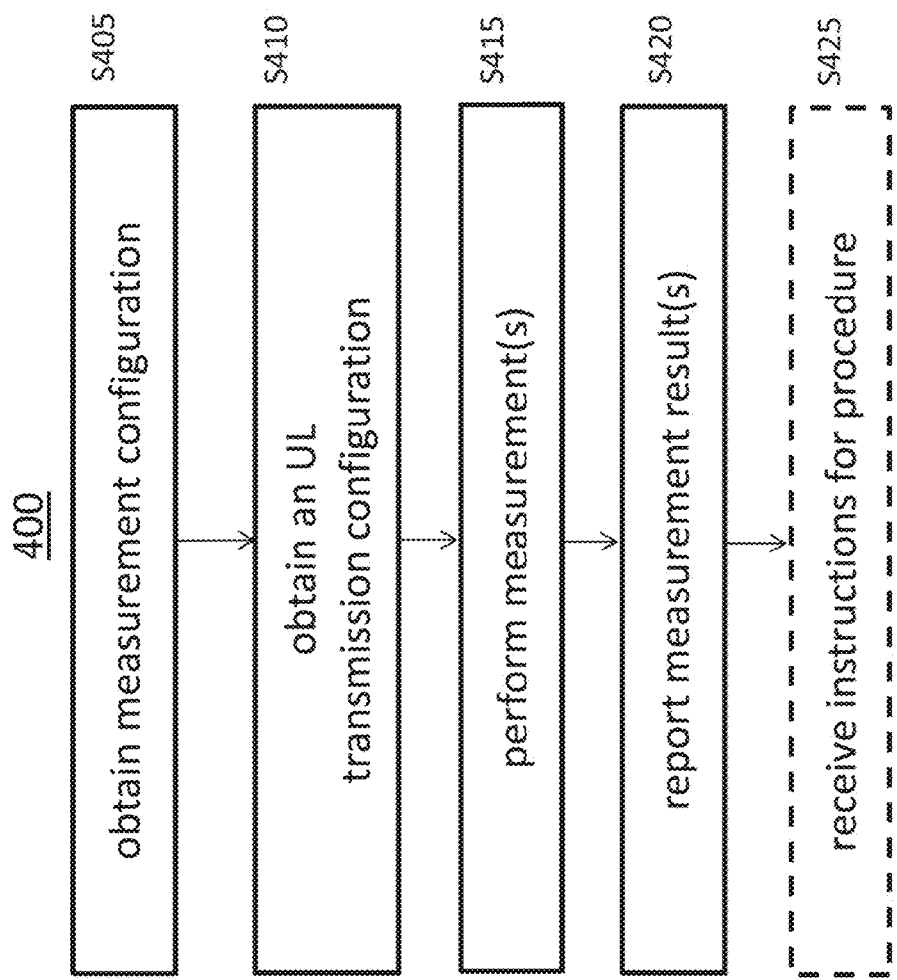
FIG. 4 illustrates a flowchart of an example method of operation of a wireless device.

FIG. 4 is a flowchart illustrating a method 400 of operating a wireless device (e.g., wireless device 105). In particular, the method 400 is a method of reporting measurements from a wireless device to a network node in a wireless communication network, such as network 100. The method 400 comprises a step S405 in which the wireless device obtains at least one measurement configuration for performing at least one measurement. The method 400 further comprises a step S410 of obtaining an uplink (UL) transmission configuration, the uplink transmission configuration comprising at least one parameter associated with a repetition level of an uplink signal to be used by the wireless device for reporting at least one measurement result to the network node. In one embodiment, the repetition level of the uplink signal is at least partially dependent on a type of measurement and/or event for which the at least one measurement is performed. The method 400 also comprises a step S415 of performing at least one measurement to obtain at least one measurement result. The method 400 further comprises a step S420 whereby the at least one measurement result is reported to the network node by applying the obtained UL transmission configuration. In one embodiment, the method optionally includes a step S425 of receiving instructions from the network node for implementing a procedure, wherein the procedure relies on the at least one measurement result.

The method 400 may also comprise additional steps, not shown. For example, method 400 may further comprise a step of obtaining a coverage enhancement level of the wireless device with respect to the network node, a repetition level of a downlink signal, and/or one or more historical repetition values used in the past. The method 400 may also comprise a step of receiving information from another network node and/or referring to a pre-defined rule. The received information and/or the determined information may influence or affect the repetition level of the uplink signal to be used for reporting the at least one measurement result. A more detailed description of the steps of method 400 are provided below for context.

In step 405, the wireless device obtains at least one measurement configuration for performing at least one measurement. The at least one measurement may include measurements on one or more signals from one or more corresponding cells. The wireless device may be further configured to report results of one or more measurements to a node. Examples of such nodes include, for example, a network node or another wireless device capable of direct UE to UE operation (e.g. D2D, V2V operation etc). The wireless device may also be configured with a particular reporting mechanism(s) to be used for transmitting the measurement results to the node. Examples of reporting mechanisms are periodic reporting, event triggered reporting, event-triggered periodic reporting, one shot reporting etc. One shot reporting may also be considered as special case of periodic reporting with one instance of sending report to the wireless device.

Event triggered reporting (or event triggered periodic reporting) may be performed by the wireless device in response to the triggering of an event. Examples of such events are:

Event A1. Serving cell becomes better than absolute threshold.
Event A2. Serving cell becomes worse than absolute threshold.
Event A3. Neighbour cell becomes better than an offset relative to the serving cell.
Event A4. Neighbour cell becomes better than absolute threshold.
Event A5. Serving cell becomes worse than one absolute threshold and neighbour cell becomes better than another absolute threshold.

In step 410, the UE obtains an uplink signal transmission configuration that comprises at least one parameter related to one or more repetition levels to be used by the UE for transmitting measurement reports or results to a node (e.g. another UE, network node etc). The obtained signal transmission configuration may be further associated with the coverage level of the UE with respect to a cell e.g. with respect to a first cell (cell1), which may be the serving cell of the UE.

The UE may obtain the uplink signal transmission configuration, including the one or more repetition levels, based on one or more of the following mechanisms:

a pre-defined rule or requirements, e.g., a maximum possible repetition of an UL signal (e.g. PUSCH, PUCCH, NPUSCH, etc.) in certain coverage enhancement level (e.g. 2048 for PUSCH under CE Mode B or enhanced coverage level) to be always used,
history or statistics, e.g. an average of the repetition values used in the past,
a most recent repetition value of an UL signal used by the UE,
by receiving the uplink signal transmission configuration from the network node (e.g. serving eNB, core network node, positioning node etc).

As noted above, the one or more repetition levels may be determined based on a coverage enhancement (CE) level. The UE may determine a CE level of the UE with respect to the node (e.g. cell1) to which the UE reports the results of the measurements. Typically, the network determines the coverage enhancement (CE) level of the UE based on different metrics, which may include:

UE and/or network node radio measurement results;
UE mobility profile;
UE location information;
UE capability.

The repetition level may be transmitted or indicated as part of the DCI (e.g. DCI-0) in a control channel. The UE may then apply this repetition levels for transmitting uplink signals. In this step, the UE may also use this information as an indication that the corresponding event reporting delay is to be extended or that additional delay can be expected if the obtained uplink repetition levels is ≥2.

In one example the UE may determine its CE level with respect to the network node based on an indication received from the network node, e.g. an indication of whether the UE is configured with CE Mode A (i.e. normal coverage level) or with CE Mode B (enhanced coverage level). According to another example, the UE may determine its CE level with respect to the node during a random access procedure, e.g. based on a number of PRACH repetitions used in cell1. In another example the UE may determine its CE level with respect to the node based on one or more radio measurements and pre-defined rule e.g. in normal coverage if the SINR≥−6 dB or in enhanced coverage if the SINR<−6 dB. In another example, rules and principles for determining the UL repetition level may be similar to those described below for the network node.

In step S415, the UE performs at least one measurement, which may include monitoring the lower layers for radio measurements (e.g. events) which have been configured according to the measurement configuration (e.g. type of measurement, thresholds for triggering events, reporting mechanism etc) received from the network node. The UE then further performs one or more radio measurements based on the received measurement configuration. The UE may further process the results of the performed measurements and use them for one or more tasks or procedures, e.g., reporting results as described in step S420.

In step S420, the UE reports the results of the performed measurements (e.g. triggered events, periodic reports etc) based on at least the received UL signal transmission configuration (received in step S410) to the node (e.g. serving network node, core network node, positioning node, another UE etc). The UE may further meet the corresponding reporting delay requirements associated with the reported or transmitted results. The reporting delay requirements can be pre-defined.

The current requirements allow an event triggered measurement reporting delay to be less than the cell identification delay (e.g. $T_{identify\ intra\_UE\ cat\ M1}$). This delay excludes any L3 filtering. However, if the cell on which the related event is triggered has been detectable for the period of time that corresponds to the cell identification delay (e.g. $T_{identify\ intra\_UE\ cat\ M1}$) and then becomes undetectable for a period≤5 seconds, then the event triggered measurement reporting delay requirement is specified as the L1 measurement period (e.g. $T_{Measurement\_Perid\_UE\ cat\ M1,\ Intra}$)

provided that the timing of that cell has not changed more than a certain threshold (e.g. ±50 Ts) and L3 filtering is not used.

As can be noted, in both cases the reporting delay does not consider the required number of repetitions in the uplink. According to the disclosed method if the network node configures the UE with an uplink signal repetition level for reporting results≥2, then additional delay in event reporting can be expected. This additional delay excludes any type gaps. The gaps are typically used for performing inter-frequency measurements, obtaining frequency synchronization of cells on different carriers (e.g. non-serving carrier). In some specific examples, the gaps might even be used for obtaining synchronization of other detectable UEs. Some examples of gaps are measurement gaps and UE autonomous gaps.

In one example, assume that the UE is configured to report the measurement results in RRC message (e.g. logical dedicated control channel such as DCCH) mapped over a physical channel (e.g. PUSCH) to the serving cell (e.g. cell1). Further, assume that the UE is configured for reporting the results in normal coverage and in enhanced coverage with repetition levels of N1 (e.g. N1=8) and N2 (e.g. N2=256) respectively. In one example, the values of N1 and/or N2 are pre-defined. In a second example, the values of N1 and N2 are configured at the UE by the network node. In a third example, the values of N1 and N2 are autonomously determined by the UE. If the UE is in the enhanced coverage level with respect to the serving cell then the UE will report the results to the serving cell using PUSCH over delay uncertainty comprising of N2 (i.e. 256) UL consecutive subframes or over 256 UL consecutive TTI of control channel (e.g. 256*TTI of DCCH for FDD or HD-FDD). In case of TDD the delay uncertainty for transmitting the results to cell1 may comprise of N2 (i.e. 256) UL consecutive subframes or TTI of control channel (i.e. DCCH TTI). In this case (i.e. TDD) the actual delay will depend on TDD configuration used in cell1. An example value of DCCH TTI is 1 ms.

Figure 5:
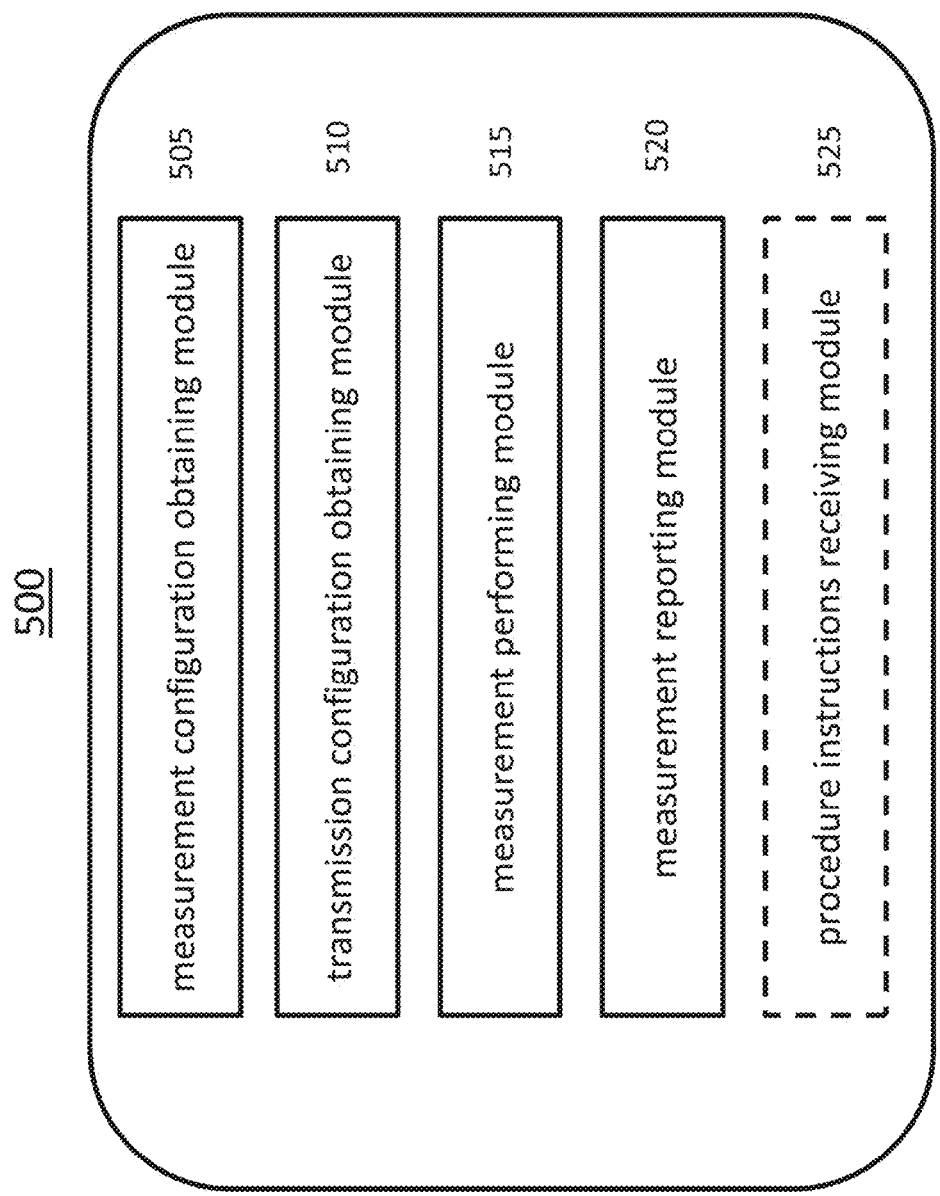
FIG. 5 illustrates a wireless communication device according to another embodiment of the disclosed subject matter.

FIG. 5 is a diagram illustrating a functional block diagram of a wireless device or UE 500 according to one embodiment. The UE 500 includes a measurement configuration obtaining module 505, which is adapted to carry out the functions of step S405 of method 400, a transmission configuration obtaining module 510, which is adapted to carry out the functions of step S410, a measurement performing module 515, which is adapted to carry out the functions of step S415, a measurement reporting module 520, which is adapted to carry out the functions of step S420, and, optionally, a procedure instructions receiving module 525, which is adapted to carry out the functions of step S425.

Figure 6:
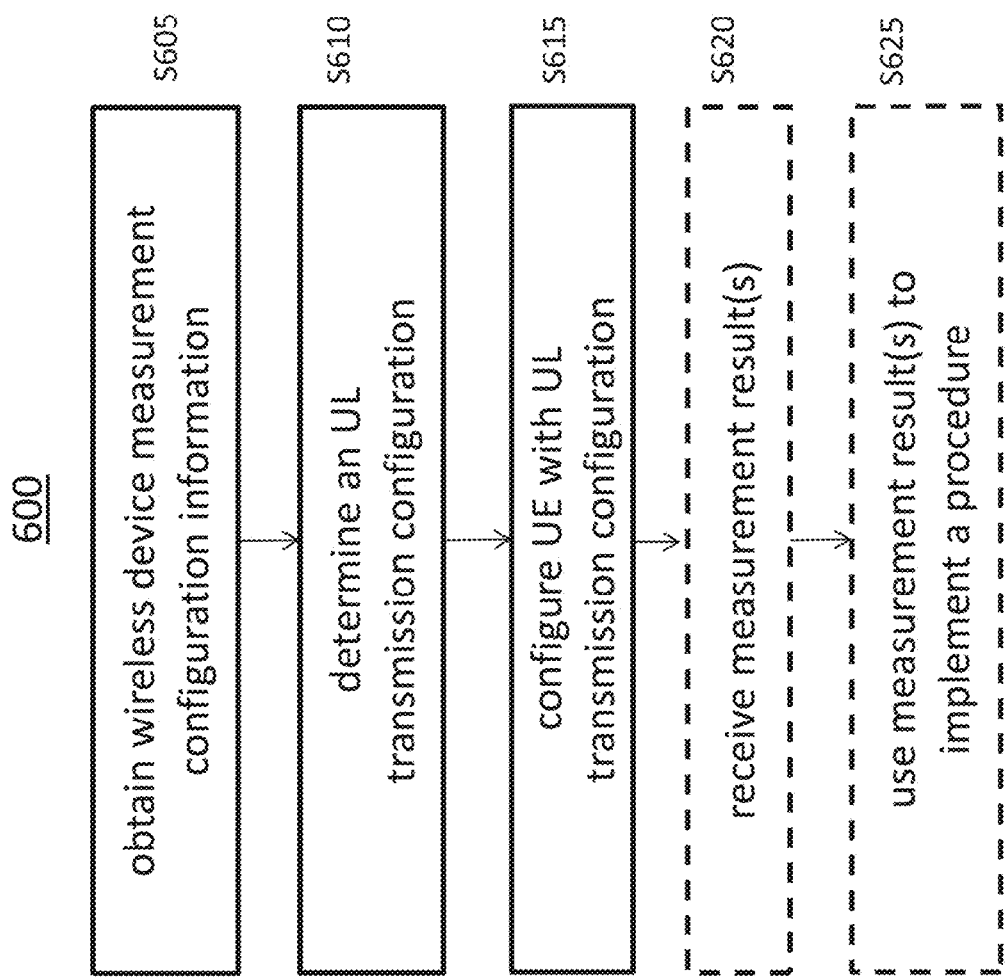
FIG. 6 illustrates a flowchart of an example method of operation of a network node.

FIG. 6 is a flowchart illustrating a method of configuring a wireless device for reporting measurements from the wireless device to a network node in a wireless communication network (e.g., radio access node 110). The method 600 comprises a step 605 in which information is obtained, e.g., by the network node, as to whether the wireless device is configured or is to be configured to perform at least one measurement. The method 600 further comprises a step S610, in which the network node determines an uplink (UL) transmission configuration for the wireless device based on the obtained information about whether the wireless device is configured or is to be configured to perform at least one measurement. The uplink transmission configuration comprises at least one parameter associated with a repetition level of an uplink signal to be used by the wireless device for reporting at least one measurement result to the network node. In one embodiment, the repetition level of the uplink signal is at least partially dependent on a type of measurement and/or event for which the at least one measurement is performed. The method 600 also comprises a step S615 in which the determined UL transmission configuration is used to configure the wireless device.

In one embodiment, the method 600 optionally includes a step S620 of receiving a radio resource control (RRC) message mapped on a physical uplink shared channel (PUSCH) from the wireless device, the RRC message including the at least one measurement result. The method 600 may further include a step S625 in which the at least one measurement result is used to implement a procedure. The procedure may include a portion to be implemented by the wireless device and hence, step S625 may include sending instructions to the wireless device to implement the wireless device portion of the procedure. Examples of such a procedure include scheduling power control, mobility, SON. MDT, positioning, network planning etc.

The method 600 may also comprise additional steps, not shown. For example, method 600 may further comprise a step of determining a coverage enhancement level of the wireless device with respect to the network node, a repetition level of a downlink signal, and/or one or more historical repetition values used in the past. The method 400 may also comprise a step of receiving information from another network node and/or referring to a pre-defined rule. The received information and/or the determined information may influence or affect the repetition level of the uplink signal to be used for reporting the at least one measurement result. A more detailed description of the steps of method 600 are provided below for context.

In step S605, the network node obtains information as to whether a wireless device or UE is configured to perform one or more radio measurements on one or more cells. The network node may obtain such information node based on one or more of the following mechanisms:
  based on a measurement configuration sent by the network node to the wireless device,
  based on information received from another node e.g. another network node and/or wireless device,
  based on previously measurement results received from the wireless device,
  based on an indication received from the wireless device,
  using a pre-defined rule or information, e.g., the wireless device is configured at the start of a session with at least certain minimum number of radio measurements.

In step S610, the network node uses the information obtained or determined in step S605 to determine an uplink signal transmission configuration to be used by the UE for reporting results of one or more radio measurements to another node. Examples of such nodes may include the network node itself, which may be a serving cell (cell1), a core network node, a positioning node, etc., or may be another UE capable of direct D2D operation etc.

If the obtained information in step S605 indicates that no measurement reporting (e.g. periodic reporting, event reporting etc) has been configured by the network node for the UE then in one example this method can be skipped. However, in such a case, according to an embodiment, the network node may still determine a certain default uplink signal transmission configuration for enabling the UE to report results at a future time.

The uplink signal transmission configuration may comprise at least one parameter associated with a certain number of repetition of uplink signals with which the UE is to transmit the results of the radio measurements. The repetition herein means for example that the said UE transmits the first signal (or initial version of a signal or the original version of the signal comprising the event which has been triggered and/or periodic report and/or event triggered periodic report, etc.) and also transmits at least a second signal, where the second signal is the identical copy of the first signal. The number of repetitions herein means that number of copies or subsequent copies of the first or the initial transmission of the signal that comprises the event reporting. The repetition of the same signal can be performed in both time and/or frequency domain. Examples of the uplink signals include PUCCH, PUSCH, NPUSCH etc. For example, the signal repetition parameter may comprise a maximum number of repetitions with which the UE can transmit the signal which carries the results of the radio measurement, e.g., a maximum number of PUSCH repetitions for transmitting the results. The signal repetition parameter may further be associated with a coverage enhancement level of the UE, e.g., a PUSCH repetition of 8 and 256 can be configured for the UE in normal coverage and enhanced coverage, respectively.

The information about the signal transmission configuration which are to be used for transmitting the measurement results (e.g. triggered events) can be known to the network node, pre-defined, or determined based on a pre-defined rule. For example, the number of repetitions used for the uplink data channel (e.g. PUSCH, NPUSCH) which is used for reporting the events can be pre-defined for different coverage levels of the UE.

In another example, the different number of repetitions to be used for reporting the results (e.g. events) can be specified (e.g. in specification) as function of the determined coverage levels and/or the number of repetitions of a DL signal/channel.

In yet another example, the serving network node may obtain the information on repetition level to use for the different coverage levels from a second node in the network (e.g. a neighbor node, UE, core-network node or any other SON type of node).

In yet another example, the signal transmission configuration which is signaled to the UE may depend on the different types of measurements and/or events which are configured at the UE. For example, some events can be configured for periodic reporting while others are configured for event-triggered reporting. It can be relevant to configure a higher repetition number for the event-triggered reporting since they are reported only once and therefore their successful reception at the network node is important. However, the events which are configured for periodic reporting can be configured with a smaller number of repetitions since they will anyhow be transmitted periodically and thus the same or similar information can be received at a later point in time at the receiving network node. In one specific example with periodic event-reporting, the signal transmission configuration may also depend on the reporting periodicity. The repetition level may decrease with increased reporting periodicity.

In yet another example, the repetition level in UL may be the same as in DL if a first condition is met, and it may be different from the DL otherwise or if a second condition is met.

In yet another example, the signal transmission configuration used for reporting measurements results differs based on the measurement results' significance level, importance level, criticality level, or priority level. For example, a larger number of UL repetitions are used for measurements which are more critical or important. For example, positioning measurements may be considered more critical compared to the measurements performed for mobility. In another example CSI measurement (i.e. used for scheduling, power control etc) can be considered more critical compared to the measurements performed for mobility and also compared to the positioning measurements.

Two different examples of UL transmission configurations comprising a number of repetitions (K) required for the different types of event-reporting are shown below in Tables 1 and 2.

TABLE 1

Specific signal transmission configuration for event-reporting (Example 1)

| Signal attributes | Signal repetition level; number of times signal is repeated (K) for event-reporting | | | |
|---|---|---|---|---|
| | $CE_1$ | $CE_2$ | $CE_3$ | $CE_4$ |
| Event-ID type | (SNR ≥ −6 dB) | (−12 dB ≤ SNR < −6 dB) | (−15 dB ≤ SNR < −12 dB) | (−18 dB ≤ SNR < −15 dB) |
| 0  A1 | 0 | 10 | 40 | 100 |
| 1  A2 | 32 | 64 | 128 | 256 |
| 2  A3 | 0 | 128 | 256 | 1024 |
| 3  A4 | 64 | 512 | 1024 | 2048 |
| ... ... | ... | ... | ... | ... |

TABLE 2

Specific signal transmission configuration for event-reporting (Example 2)

| Signal attributes | Reporting period- | Signal repetition level; number of times signal is repeated (K) for periodic event-reporting | | | |
|---|---|---|---|---|---|
| | | $CE_1$ | $CE_2$ (−12 dB ≤ SNR < −6 dB) | $CE_3$ (−15 dB ≤ SNR < −12 dB) | $CE_4$ (−18 dB ≤ SNR < −15 dB) |
| Event-ID type | icity (ms) | (SNR ≥ −6 dB) | | | |
| 0  A1 | 10 | 8 | 128 | 258 | 2048 |
| 1  A1 | 20 | 16 | 258 | 512 | 2048 |
| 2  A1 | 40 | 64 | 512 | 1024 | 2048 |
| 3  A2 | 10 | 64 | 512 | 1024 | 2048 |
| ... ... | ... | ... | ... | ... | ... |

As shown in examples 1 and 2 above, the one or more repetition levels may be determined based on a coverage enhancement (CE) level. The UE may determine a CE level of the UE with respect to the node (e.g. cell1) to which the UE reports the results of the measurements. Typically, however, a network node determines the coverage enhancement (CE) level of the UE based on different metrics, which may include:

UE and/or BS radio measurement results;
UE mobility profile;
UE location information;
UE capability.

For example, the network node may obtain UE radio measurements such as RSRP and/or RSRQ and/or SINR or SNR with respect to cell1 (e.g., the serving cell) and determine its coverage in the target area associated with the network node.

In another example the network node may obtain UE radio measurements such as RSRP and/or RSRQ and/or SINR or SNR with respect to cell2 (e.g., a neighbor cell) and determine its coverage in the target area associated with the network node. Cell1 and cell2 may be served by the same network node or different network nodes.

The network node may also perform one or more radio measurements on signals transmitted by the UE to determine the coverage level including, e.g., UL SINR, UL signal strength, etc. The network node may also combine the UE measurements and the UL measurements performed by the network node to more accurately determine the UE coverage level with respect to the serving cell and/or with respect to at least one neighbor cell e.g. cell2.

The network node may also observe the UE mobility profile to determine the UE coverage in an area. The UE mobility profile is characterized by one or more of: UE speed or velocity such as Doppler speed, UE direction of movement, UE acceleration, UE trajectory etc. For example, based on UE direction of motion and speed the network node may predict the UE coverage at certain time in future. The network node may determine the UE mobility profile by measuring UL signals of the UE.

The network node may also obtain the UE location information and use this to determine the UE coverage in the area. The location of the UE can be determined based on one or combination of location methods such as GNSS or A-GNSS, enhanced cell ID, time of arrival (TOA) of signals, OTDOA etc. The UE location may also be obtained by paging the UE, e.g., when it is in IDLE state. The location information may comprise a geographical and/or logical location, e.g., location coordinates, UE proximity to an object with a known location, UE location in a cell or in a cell portion, location within a tracking area, etc.

The network node may also obtain the UE capability information which indicates whether the UE is capable of operating (i.e. receiving and/or transmitting signals) under enhanced coverage e.g. SINR<−6 dB. The UE capability information can be obtained from the UE and/or from another network node which contains the UE capability. For example, if the UE capability information indicates that the UE is capable of operating under enhanced coverage and the UE is also physically operating under enhanced coverage (e.g. SINR=−10 dB) then the network may consider that the UE is actually operating in enhanced coverage.

The network node may also continuously or regularly monitor the coverage level of the UE in the area by using one or more criteria mentioned above. This enables network node to know any change in the coverage level of the UE in the area e.g. with respect to the first network node and/or with respect to at least one second network node.

The signaling of the signal transmission configurations will enable the UE to report the measurement results (e.g., events) by using the recommended number of repetitions in the uplink. Consequently, the measurement results (e.g., events) will be correctly received in the node (e.g., serving network node). In contrast, according to current solutions the measurement reporting delay purely depends on the downlink channel. Yet another advantage is that the scheduling of UL resources can be more efficient if accounting for the number of repetitions.

The current requirements specify the maximum event triggered measurement reporting delay up to the cell identification delay (e.g. $T_{identify\_intra\_UE\_cat\_M1}$). This delay excludes any L3 filtering. However, if the cell on which the related event is triggered has been detectable for the period of time that corresponds to the cell identification delay (e.g. $T_{identify\_intra\_UE\_cat\_M1}$) and then becomes undetectable for a period≤5 seconds, then the event triggered measurement reporting delay requirement is specified as the L1 measurement period (e.g. $T_{Measurement\_Period\_UE\_cat\_M1,\ Intra}$) provided that the timing of that cell has not changed more than a certain threshold (e.g. ±50 Ts) and L3 filtering is not used.

As can be noted, in both cases the reporting delay does not consider the required number of repetitions in the uplink. That is, in existing solutions the measurement results are transmitted to the serving cell without any repetition regardless of the UE CE with respect to its serving cell. The main problem is that the measurement results (e.g. events) may not be successfully received at the node (e.g. serving network node) if current requirements are applied and especially if the UE is operating under enhanced coverage. This is because the uplink received quality without UL repetitions of signals (e.g. PUSCH) containing the measurement results will be below the required level and will lead to decoding failure at the receiver of the serving network node. Furthermore, uplink and downlink repetitions may not be identical. This is because the uplink repetition levels might be much higher than the corresponding downlink repetitions due to, e.g., different transmitting power levels and/or different radio conditions. In other words, the current reporting mechanism especially under enhanced coverage is not reliable and will lead to failure of any procedure which relies on UE reported measurement results. Examples of such procedures are scheduling power control, mobility, SON. MDT, positioning, network planning etc.

To mitigate the shortcoming of the existing reporting mechanism, an additional delay in reporting of measurement results may be allowed if the UE is operating under enhanced coverage and requires repetitions for uplink transmissions. This additional delay excludes any type gaps. The gaps are typically used for performing inter-frequency measurements, obtaining frequency synchronization of cells on different carriers (e.g. non-serving carrier). In some specific examples, the gaps might even be used for obtaining synchronization of other detectable UEs. Some examples of gaps are measurement gaps and UE autonomous gaps.

In step S615, the network node configures the UE (e.g., signals or transmits a UE configuration) with the determined signal transmission configuration comprising at least one parameter associated with a certain number of repetition of uplink signals. The UL signals are to be used by the UE for transmitting the measurement results to the node. The transmitted signal transmission configuration to the UE may be expressed in terms of an index or an identifier which may be pre-defined where the index corresponds to the recommended values of repetition levels to be used by the UE for reporting the measurement results (e.g. events) to the node. In another example, the index corresponding to the signal transmission configuration can be broadcasted by the serving network node. In one example the information related to the signal transmission configuration can be signaled to the UE using dedicated RRC signaling.

In step S620, the network node receives the results of the measurements (e.g. events, periodic measurement etc) which are reported by the UE to a node, e.g., to its serving cell. The result of the measurements (e.g., events) can be used by the network node for one or various operational tasks or procedures. Examples of the operational tasks are: positioning, scheduling of signals, UL and/or DL power control, minimization of drive test (MDT), measurement collection, obtaining measurement statistics, creating maps of measurements associated with UE locations, SON, resource optimization, mobility, UE transmit timing control, timing advance, etc.

Figure 7:
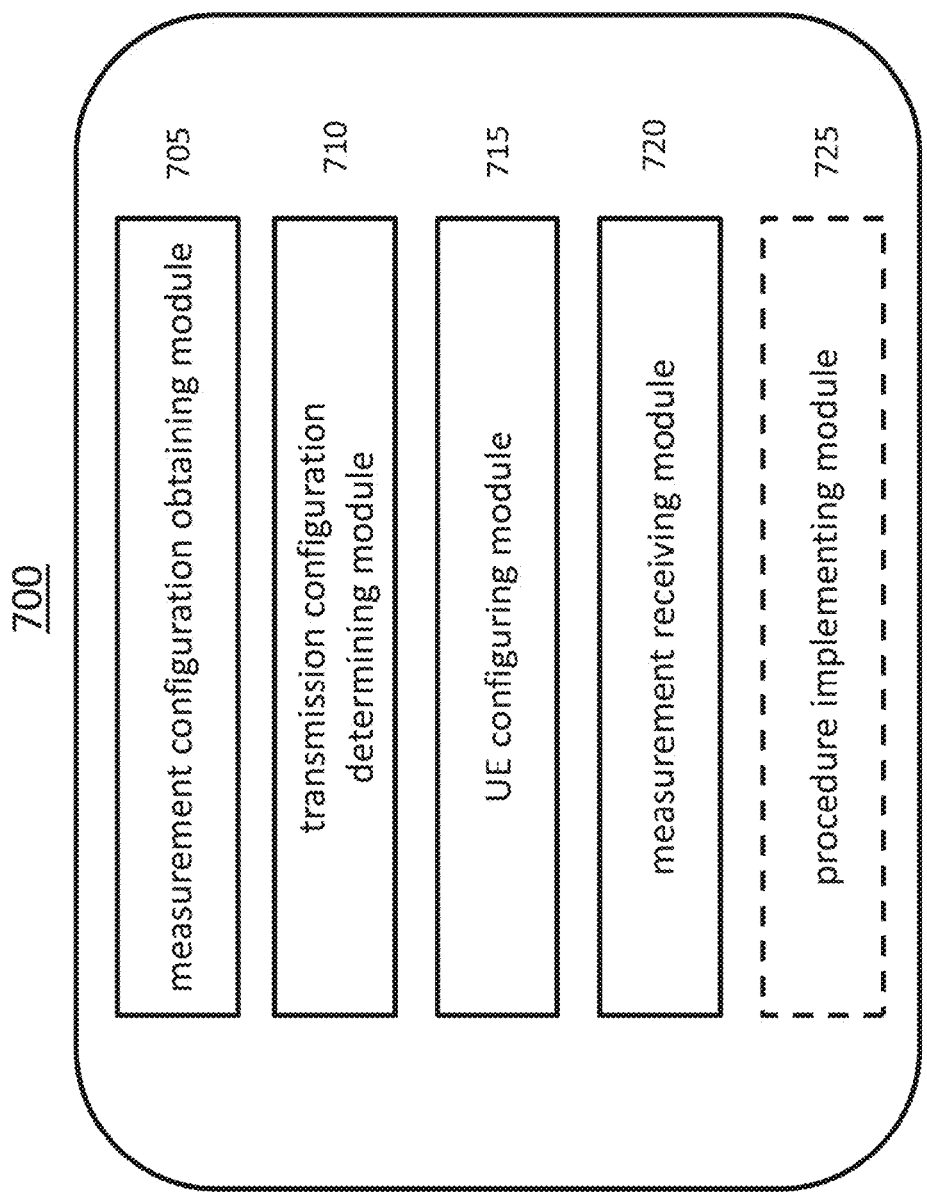
FIG. 7 illustrates a network node according to another embodiment of the disclosed subject matter.

FIG. 7 is a diagram illustrating a functional block diagram of a network node 700 according to one embodiment. The network node 700 includes a measurement configuration obtaining module 705, which is adapted to carry out the functions of step S605 of method 600, a transmission configuration determining module 710, which is adapted to carry out the functions of step S610, a UE configuring module 715, which is adapted to carry out the functions of step S615, and a measurement receiving module 720, which is adapted to carry out the functions of step S620. The network node 700 may also include a procedure implementing module 725 adapted to carry out the functions of step S625 of method 600.

In embodiments where the wireless device includes a general purpose microprocessor, as shown in FIG. 2, a computer program product may be provided. The computer program product includes a computer readable medium (e.g., memory 210) storing a computer program comprising computer readable instructions. The computer readable medium may be a non-transitory computer readable medium, such as, but not limited, to magnetic media (e.g., a hard disk), optical media (e.g., a DVD), memory devices (e.g., random access memory), and the like. In some embodiments, the computer readable instructions are configured such that when executed by processing circuitry 205, the computer readable instructions cause the wireless device to perform steps described above (e.g., steps described above with reference to the flow charts in FIG. 4). In other embodiments, the wireless device may be configured to perform steps described herein without the need for code. That is, for example, processing circuitry 205 may consist merely of one or more ASICs. Hence, the features of the embodiments described herein may be implemented in hardware and/or software.

Similarly, in embodiments where the network node includes a general purpose microprocessor, as shown in FIG. 4, a computer program product may also be provided. The computer program product includes a computer readable medium (e.g., memory 310) storing a computer program comprising computer readable instructions. The computer readable medium may be a non-transitory computer readable medium, such as, but not limited, to magnetic media (e.g., a hard disk), optical media (e.g., a DVD), memory devices (e.g., random access memory), and the like. In some embodiments, the computer readable instructions are configured such that when executed by processing circuitry 305, the computer readable instructions cause the network node to perform steps described above (e.g., steps described above with reference to the flow charts in FIG. 6). In other embodiments, the network node may be configured to perform steps described herein without the need for code. That is, for example, processing circuitry 305 may consist merely of one or more ASICs. Hence, the features of the embodiments described herein may be implemented in hardware and/or software.

While various embodiments of the present disclosure are described herein (including the appendices), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of reporting measurements from a wireless device to a network node in a wireless communication network, the method comprising:

obtaining at least one measurement configuration for performing at least one measurement;

obtaining an uplink (UL) transmission configuration, the UL transmission configuration comprising at least one parameter associated with a repetition level of an uplink signal to be used by the wireless device for reporting at least one measurement result to the network node, wherein the repetition level of the uplink signal is at least partially dependent on a type of measurement and/or event for which the at least one measurement is performed;

performing at least one measurement to obtain at least one measurement result; and reporting the at least one measurement result to the network node by applying the obtained UL transmission configuration, wherein if the repetition level of the uplink signal is greater than or equal to two, the wireless device reports the at least one measurement result under a reporting delay requirement having a greater delay than a reporting delay requirement under which the wireless device reports the least one measurement result if the repetition level of the uplink signal is less than two.

2. The method of claim 1, wherein the repetition level of the uplink signal is further at least partially dependent on one or more of:

a repetition level of a downlink signal;

information received from another network node;

a coverage enhancement (CE) level of the wireless device with respect to the network node;

a pre-defined rule; and/or one or more historical repetition values used in the past.

3. The method of claim 1, wherein the type of measurement and/or event includes a significance level of the measurement and/or event.

4. The method of claim 1, wherein the type of measurement and/or event is one of: a channel state information (CSI) measurement, a measurement for positioning, a positioning event, a measurement for radio link monitoring, a measurement for self-organizing network, a measurement for minimization of drive tests, a measurement for mobility, or a mobility event.

5. The method of claim 4, wherein when the uplink signal is used for reporting a CSI measurement the repetition level is higher than when the uplink signal is used for reporting a measurement performed in relation to a mobility event.

6. The method of claim 4, wherein when the uplink signal is used for reporting a CSI measurement the repetition level is higher than when the uplink signal is used for reporting a measurement performed in relation to a positioning event.

7. The method of claim 4, wherein when the uplink signal is used for reporting a measurement performed in relation to a positioning event the repetition level is higher than when the uplink signal is used for reporting a measurement performed in relation to a mobility event.

8. The method of claim 1, wherein the type of measurement and/or event is either periodically reported or event-triggered and, wherein when the uplink signal is used for reporting an event-triggered measurement the repetition level is higher than when the uplink signal is used for reporting a periodic measurement.

9. The method of claim 1, wherein the at least one measurement result is reported to the network node in a radio resource control (RRC) message mapped on a physical uplink shared channel (PUSCH).

10. The method of claim 1, further comprising:
receiving instructions from the network node for implementing a procedure, wherein the procedure relies on the at least one measurement result.

11. The method of claim 10, wherein the procedure is one of a scheduling procedure, a power control procedure, a mobility procedure, a self-organizing network procedure, a minimization of drive test procedure, and a network planning procedure.

12. The method of claim 1, wherein the at least one parameter is a maximum number of repetitions to be used by the wireless device for reporting the at least one measurement result.

13. A method of configuring a wireless device for reporting measurements from the wireless device to a network node in a wireless communication network, the method comprising:
obtaining information about whether the wireless device is configured or is to be configured to perform at least one measurement;
based on the obtained information about whether the wireless device is configured or is to be configured to perform at least one measurement, determining an uplink (UL) transmission configuration for the wireless device, the UL transmission configuration including at least one parameter associated with a repetition level of an uplink signal to be used by the wireless device for reporting at least one measurement result to the network node, wherein the repetition level of the uplink signal is at least partially dependent on a type of measurement and/or event for which the at least one measurement is performed;
configuring the wireless device with the determined UL transmission configuration,
wherein if the repetition level of the uplink signal is greater than or equal to two, the wireless device is allowed a greater delay in reporting the at least one measurement result than if the repetition level of the uplink signal is less than two.

14. The method of claim 13, wherein the repetition level of the uplink signal is further at least partially dependent on one or more of:
a repetition level of a downlink signal;
information received from another network node;
a coverage enhancement (CE) level of the wireless device with respect to the network node;
a pre-defined rule; and/or
one or more historical repetition values used in the past.

15. The method of claim 13, wherein the type of measurement and/or event includes a significance level of the measurement and/or event.

16. The method of claim 13, wherein the type of measurement and/or event is one of: a channel state information (CSI) measurement, a positioning event, or a mobility event.

17. The method of claim 15, wherein when the uplink signal is used for reporting a CSI measurement the repetition level is higher than when the uplink signal is used for reporting a measurement performed in relation to a mobility event.

18. The method of claim 15, wherein when the uplink signal is used for reporting a CSI measurement the repetition level is higher than when the uplink signal is used for reporting a measurement performed in relation to a positioning event.

19. The method of claim 15, wherein when the uplink signal is used for reporting a measurement performed in relation to a positioning event the repetition level is higher than when the uplink signal is used for reporting a measurement performed in relation to a mobility event.

20. The method of claim 13, wherein the type of measurement and/or event is either periodically reported or event-triggered and, wherein when the uplink signal is used for reporting an event-triggered measurement the repetition level is higher than when the uplink signal is used for reporting a periodic measurement.

21. The method of claim 13, further comprising receiving a radio resource control (RRC) message mapped on a physical uplink shared channel (PUSCH) from the wireless device, the RRC message including the at least one measurement result.

22. The method of claim 13, further comprising:
receiving the at least one measurement result;
using the at least one measurement result to implement a procedure; and
sending instructions to the wireless device to implement a wireless device portion of the procedure.

23. The method of claim 22, wherein the procedure is one of a scheduling procedure, a power control procedure, a mobility procedure, a self-organizing network procedure, a minimization of drive test procedure, and a network planning procedure.

24. The method of claim 13, wherein the at least one parameter is a maximum number of repetitions to be used by the wireless device for reporting the at least one measurement result.

25. A wireless device operable to report measurements to a network node in a wireless communication network, the wireless device comprising:
a transceiver;
a processor; and
memory containing instructions that, when executed by the processor, cause the wireless device to perform a method comprising:
obtaining at least one measurement configuration for performing at least one measurement;
obtaining an uplink (UL) transmission configuration, the UL transmission configuration comprising at least one parameter associated with a repetition level of an uplink signal to be used by the wireless device for reporting at least one measurement result to the network node, wherein the repetition level of the uplink signal is at least partially dependent on a type of measurement and/or event for which the at least one measurement is performed;
performing at least one measurement to obtain at least one measurement result; and
reporting the at least one measurement result to the network node by applying the obtained UL transmission configuration,
wherein if the repetition level of the uplink signal is greater than or equal to two, the wireless device reports the at least one measurement result under a reporting delay requirement having a greater delay than a reporting delay requirement under which the wireless device reports the least one measurement result if the repetition level of the uplink signal is less than two.

26. A network node operable to configure a wireless device for reporting measurements to the network node in a wireless communication network, the network node comprising:
- a transceiver;
- a processor; and
- memory containing instructions that, when executed by the processor, cause the network node to perform a method comprising:
  - obtaining information about whether the wireless device is configured or is to be configured to perform at least one measurement;
  - based on the obtained information about whether the wireless device is configured or is to be configured to perform at least one measurement, determining an uplink (UL) transmission configuration for the wireless device, the UL transmission configuration including at least one parameter associated with a repetition level of an uplink signal to be used by the wireless device for reporting at least one measurement result to the network node, wherein the repetition level of the uplink signal is at least partially dependent on a type of measurement and/or event for which the at least one measurement is performed;
  - configuring the wireless device with the determined UL transmission configuration,
  - wherein if the repetition level of the uplink signal is greater than or equal to two, the wireless device is allowed a greater delay in reporting the at least one measurement result than if the repetition level of the uplink signal is less than two.

* * * * *